UNITED STATES PATENT OFFICE.

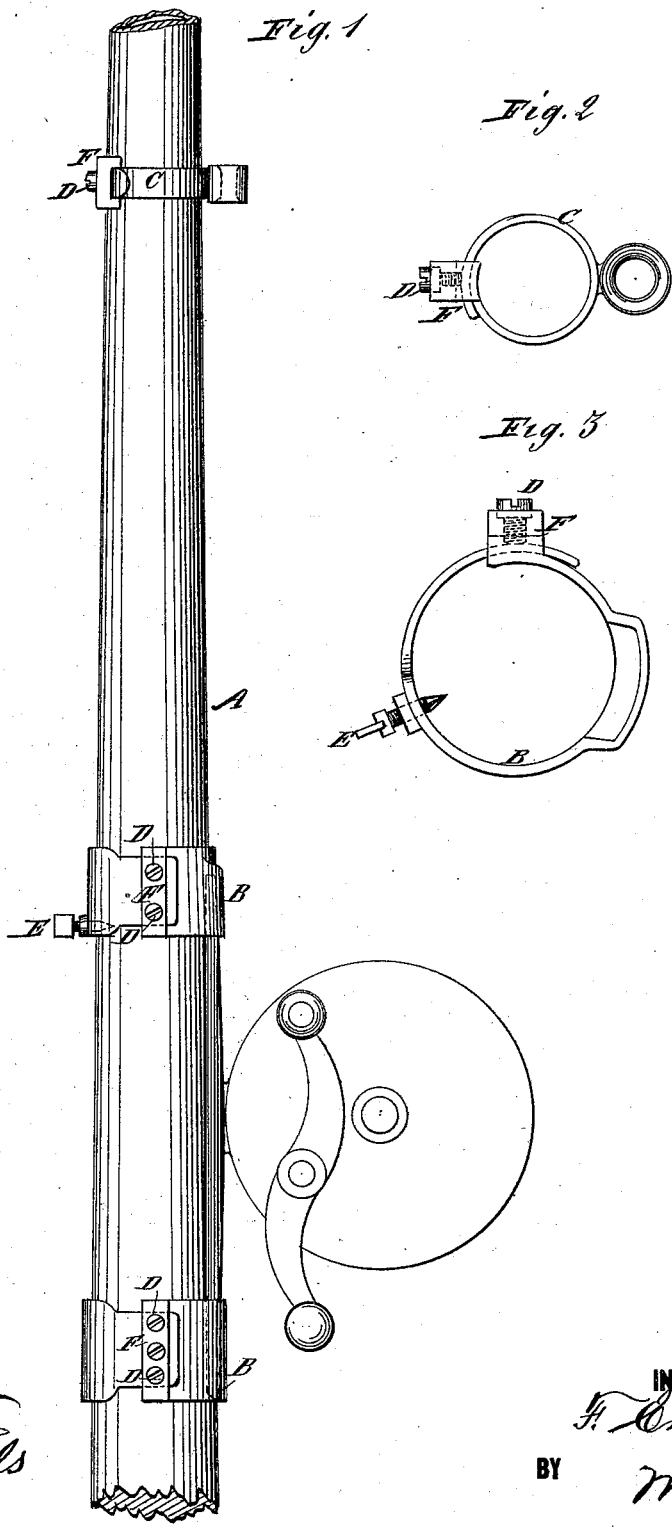

FRANCIS ENDICOTT, OF NEW YORK, N. Y., ASSIGNOR TO HIMSELF AND HENRY F. CROSBY, OF SAME PLACE.

IMPROVEMENT IN GUIDE AND REEL BANDS FOR FISHING-RODS.

Specification forming part of Letters Patent No. 173,534, dated February 15, 1876; application filed January 3, 1876.

*To all whom it may concern:*

Be it known that I, FRANCIS ENDICOTT, of the city, county, and State of New York, have invented a new and Improved Guide and Reel Bands for Fishing-Rods, of which the following is a specification:

My invention consists of open (expanding and contracting) guide and reel bands for fishing-rods, constructed with a loop and binding-screws on one end, and a tongue on the other end, passing through the loop for being readily fastened on rods of different sizes, so that, in case a rod is broken, a temporary rod can be easily rigged, and the carrying of a rod may be avoided by taking the rings and reel along and procuring the rod when wanted for use.

Figure 1 is an elevation of a section of a rod having my improved guide and reel bands. Fig. 2 is a top view of a guide-band, and Fig. 3 is a top view of the reel-band.

Similar letters of reference indicate corresponding parts.

A is the rod; B, the reel-bands, and C the guide-bands. These bands I make in the form of open rings, with one part overlapping the other at the opening, and on one part I make a strong loop, F, with binding-screws D in the bridge, and pass the other part through the loop under the screws, by which it is bound fast when adjusted to the size of the rod. A set-screw, E, may be employed for preventing the bands from turning on the rod. The binding-screws may be countersunk in the bridge of the loop to avoid projecting too much.

By this contrivance much inconvenience for want of a rod, and in the carrying of a rod long distances, may be avoided.

Having thus described my invention, I claim as new and desire to secure by Letters Patent—

The open (expanding and contracting) guide and reel bands B C for fishing-rods, arranged to overlap, and having a loop and binding-screws, substantially as specified.

FRANCIS ENDICOTT.

Witnesses:
   T. B. MOSHER,
   ALEX. F. ROBERTS.